United States Patent [19]

Hara et al.

[11] Patent Number: 5,532,924
[45] Date of Patent: Jul. 2, 1996

[54] ATTITUDE CONTROL METHOD OF A VISUAL SENSOR UTILIZED FOR AN INDUSTRIAL ROBOT

[75] Inventors: Ryuichi Hara, Fujiyoshida; Eiichi Kobayashi, Minamitsuru-gun, both of Japan

[73] Assignee: Fanuc Ltd., Yamanashi, Japan

[21] Appl. No.: 360,690

[22] PCT Filed: May 19, 1994

[86] PCT No.: PCT/JP94/00808

§ 371 Date: Jan. 4, 1995

§ 102(e) Date: Jan. 4, 1995

[87] PCT Pub. No.: WO94/27791

PCT Pub. Date: Dec. 8, 1994

[30] Foreign Application Priority Data

May 20, 1993 [JP] Japan .................................... 5-118662

[51] Int. Cl.$^6$ ................................................. G06F 19/00
[52] U.S. Cl. ................. 364/167.01; 318/568.13; 364/193; 395/89; 395/94; 901/5; 901/42; 901/47
[58] Field of Search ........................ 364/474.28, 474.37, 364/474.03, 167.01, 191–193; 901/3–5, 9, 10, 42, 44, 46, 47; 395/89, 94; 219/124.34; 318/577, 578, 576, 568.11, 568.13, 568.14, 568.16

[56] References Cited

U.S. PATENT DOCUMENTS 4,380,696 4/1983 Masaki ................................... 395/94
4,761,596 8/1988 Nio et al. .............................. 395/94
4,815,006 3/1989 Andersson et al. ................. 395/94 X
4,969,107 11/1990 Mizutani ............................... 395/94
4,969,108 11/1990 Webb et al. .......................... 395/94
5,083,073 1/1992 Kato et al. ........................ 395/94 X

FOREIGN PATENT DOCUMENTS 57-109576  7/1982  Japan .
62-187574  8/1987  Japan .
64-37604   2/1989  Japan .

Primary Examiner—Joseph Ruggiero
Attorney, Agent, or Firm—Nikaido, Marmelstein, Murray & Oram

[57] ABSTRACT

An attitude control method of a visual sensor (3) utilized for a robot (1), with the object of simplifying the teaching operation for adjusting the attitude of the visual sensor, enabling continual control of sensor attitude, and obtaining highly reliable measuring accuracy of the sensor for detecting positions of objects. The positions of a starting point and an end point on a path of the tool (2) through which the tool moves are taught. The initial attitude data representing the attitude at the starting point of the visual sensor (3) are memorized. The moving attitude data representing the attitude of the visual sensor when the tool moves through the path are periodically sampled and memorized. The attitude of the sensor (3) is controlled so that the attitude of the sensor after sampling the moving attitude data at each sampling time matches the attitude represented by the initial attitude data, based on both the initial attitude data and the moving attitude data. By following the above steps, the attitude of the sensor is controlled so that the visual center P of the sensor matches a junction point between two objects (4,5) to be detected by the sensor when the tool moves.

1 Claim, 4 Drawing Sheets

Fig.1

```
POSITIONS OF A STARTING POINT AND AN END POINT
ON A PATH OF THE TOOL THROUGH WHICH THE TOOL
MOVES ARE TAUGHT.
```

```
INITIAL ATTITUDE DATA REPRESENTING ATTITUDE AT
THE STARTING POINT OF THE VISUAL SENSOR IS
MEMORIZED.
```

```
MOVING ATTITUDE DATA REPRESENTING ATTITUDE OF
THE VISUAL SENSOR WHEN THE TOOL MOVES THROUGH
THE PATH ARE PERIODICALLY SAMPLED AND MEMORIZED.
```

```
ATTITUDE OF THE SENSOR IS CONTROLLED SO THAT THE
ATTITUDE OF THE SENSOR AFTER SAMPLING THE MOVING
ATTITUDE DATA MATCHES THE ATTITUDE REPRESENTED
BY THE INITIAL ATTITUDE DATA, BASED ON BOTH THE
INITIAL AND THE MOVING ATTITUDE DATA.
```

ATTITUDE CONTROL METHOD OF A VISUAL SENSOR UTILIZED FOR AN INDUSTRIAL ROBOT

TECHNICAL FIELD

The present invention relates to an attitude control method of a visual sensor utilized for an industrial robot, more particularly, to an attitude control method of a visual sensor for detecting the positions of objects to be welded together prior to movement of a welding torch attached to a welding robot.

BACKGROUND ART

A visual sensor requires that its attitude be controlled so that the sensor can continue to detect objects, in all positions between two points, namely, a starting point and an end point on a moving path of a tool attached to a robot, when the robot moves the tool. For example, a visual sensor for a welding robot has its attitude controlled so that the sensor can continue to detect the positions of the objects to be welded together, prior to the movement of a welding torch attached to the robot.

In prior art, attitude control methods of a visual sensor utilized for an industrial robot have generally comprised the steps of dividing into a plurality of sections a tool path which lies between two points, namely a starting point and an end point, of the tool attached to the robot when the robot moves the tool; manually adjusting the attitude of the visual sensor when the tool is on each point between the divided adjacent sections in advance so that the sensor can accurately detect the objects; teaching the attitude representing data determined by the manual adjustment step; and controlling the attitude of the sensor when the tool is on each of the plurality of points between the two points in accordance with the attitude data taught in advance.

The attitude control methods of a visual sensor utilized for an industrial robot according to the prior art present no problem if the path between two points is a direct line because the necessary teaching points are merely two, therefore it does not require time and labor. However, if the path is a curve, there is the problem of the time and labor required to teach the attitude of the sensor so that the sensor can keep detecting the objects within the range of its sight at a large number of points when the tool moves between the two points. Furthermore, according to the prior art, it is possible to optimize the attitude at the taught points so that the sensor passes through the points, however, the attitude in between the taught points cannot be optimum. Therefore, the measuring accuracy for detecting positions of the objects by the visual sensor is only good at each of the taught points, but is not continually good in between the taught points.

DISCLOSURE OF THE INVENTION

Therefore, in the light of the above mentioned problems, it is an object of the present invention to provide an attitude control method of a visual sensor utilized for an industrial robot, thereby simplifying the teaching operation for adjusting the attitude of the visual sensor, enabling continual control of sensor attitude, and obtaining highly reliable measuring accuracy of the sensor for detecting positions of objects.

Fig.1 shows a basic process flowchart of an attitude control method of a visual sensor according to the present invention. The attitude control method of a visual sensor utilized for an industrial robot according to the present invention to overcome the aforementioned problems, wherein the method controls the attitude of the visual sensor 3 so that the sensor 3 may detect an object, for example, a juncture between two objects such as 4 and 5 when a tool 2 attached to a robot 1 moves along with the sensor 3 incorporated into the tool 2, comprises the following steps.

(STEP 1) Positions of a starting point and an end point on a path of the tool 2 through which the tool 2 moves are taught.

(STEP 2) Initial attitude data representing the attitude at the starting point of the visual sensor 3 is memorized.

(STEP 3) Moving attitude data representing the attitude of the visual sensor 3 when the tool 2 moves through the path are periodically sampled and memorized.

(STEP 4) Attitude of the sensor 3 is controlled so that the attitude of the sensor 3 after sampling the moving attitude data at each sampling time matches the attitude represented by the initial attitude data, based on both the initial attitude data and the moving attitude data.

By carrying out the above steps, the attitude of the sensor 3 is controlled so that the visual center P of the sensor 3 matches the juncture between objects to be detected by the sensor 3, for example, two objects 4 and 5, when the tool 2 moves.

The attitude control method of a visual sensor 3 utilized for an industrial robot according to the present invention automatically controls the attitude of the visual sensor 3 so that the moving attitude of the sensor 3 can be related to the initial attitude of the sensor 3 after sampling the moving attitude data of the sensor 3 when the tool 2 attached to the robot 1 moves, thereby reducing the number of attitude teaching points of the sensor 3 and preset time required for the teaching, and improving measuring accuracy because of the stabilized attitude of the sensor 3.

Hereinafter, embodiments of the present invention will be explained in detail referring to the accompanying drawings.

BRIEF DESCRIPTION OF DRAWINGS

FIG. 1 shows a basic process flowchart of an attitude control method of a visual sensor according to the present invention;

BEST MODE FOR CARRYING OUT THE INVENTION

Figure 2:
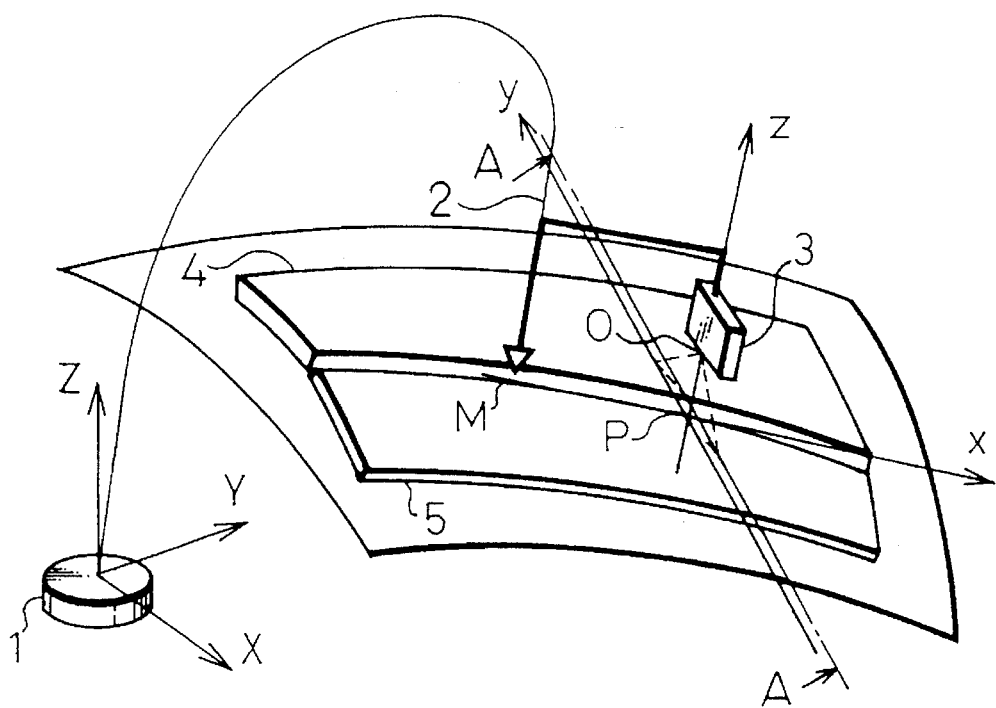
FIG. 2 shows a schematic structure to explain a welding robot.

FIG. 2 shows a schematic structure to explain a welding robot. This figure shows a robot 1 which is moving a welding torch 2 as a tool and is welding two iron plates 4 and 5 to be joined together. The visual sensor 3 is incorporated into the welding torch 2 and moves together with it. The robot 1 detects welding positions between the iron plates 4 and 5 by means of the visual sensor 3 prior to the movement of the torch 2. The robot 1 measures the distance between the sensor 3 and the surface of the two iron plates 4 and 5. Then, the robot 1 controls the attitude of the sensor 3 based on the results of the measurement, as will be explained later, when it moves the welding torch 2. In this drawing, capital letters such as X, Y and Z denote three orthogonal coordinate axes, while lower-case letters such as x, y and z denote an axis system defined by the welding position on the plates 4 and 5 to be welded together by the welding torch 2. The letter x denotes an axis which passes through the point M, which denotes the tip of the welding torch 2, and the visual center P of the visual sensor 3, and is parallel to the forward direction of the visual sensor 3. The letter z denotes an axis which passes through the visual center P and the center O of the visual sensor 3. The letter y denotes an axis which is orthogonal to both the x axis and the z axis. The center O of the visual sensor 3 is the position of the light source of the laser beam of the visual sensor 3, which illuminates the two iron plates 4 and 5.

Figure 3:
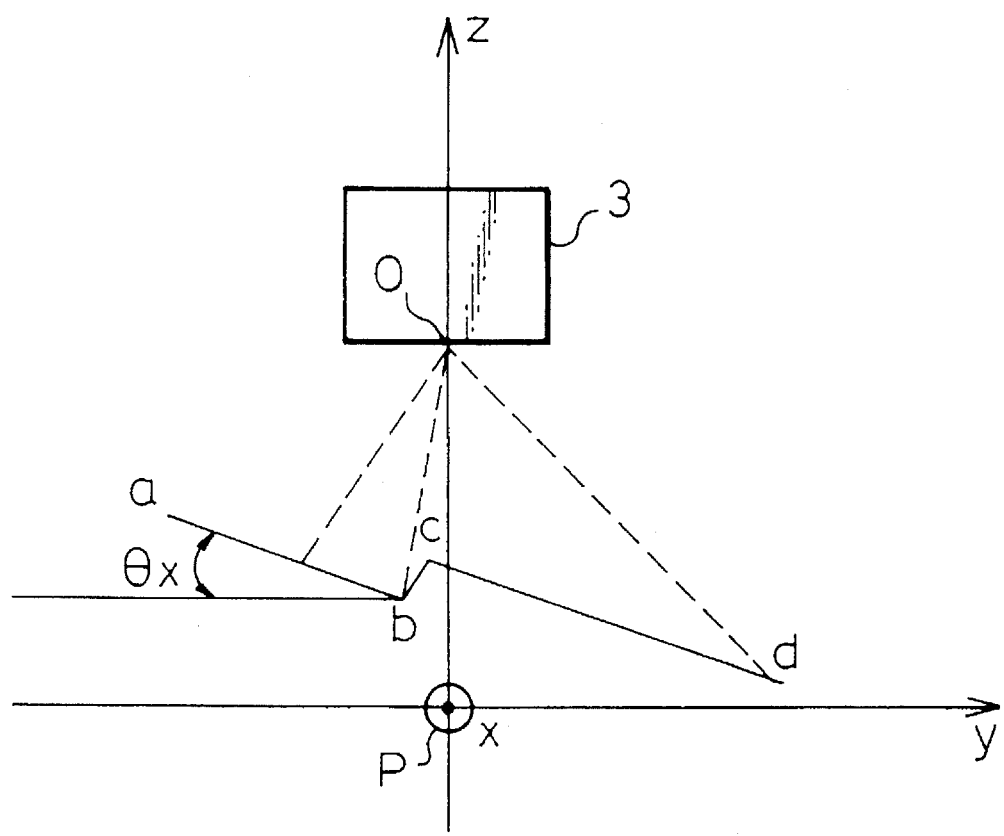
FIG. 3 shows a sectional view taking along line A—A in FIG. 2.

FIG. 3 shows a sectional view taking along the line A—A in FIG. 2. In this drawing, the line passing through points a, b, c and d represents the surfaces of the two iron plates 4 and 5. The line from a to b indicates the iron plate 5, and the line from c to d indicates the iron plate 4. The visual sensor 3 illuminates a laser beam onto the iron plates and detects the reflected light, as shown by broken lines in the drawing, thereby measuring positions of the iron plates to be welded together. As a result of the measurement, the point b is recognized as a junction point of the two iron plates.

The attitude control of the visual sensor 3 is executed by pivoting the welding torch 2 about the x axis so that the angle $\theta_x$ at each measuring time shown in the drawing becomes equal to reference angle $\theta_{xo}$ obtained at the initial measuring time when the torch 2 is at the starting point. It can be understood that in the example, the visual objects can be positioned within the range of the visual sensor's sight by rotating only about the x axis for the adjustment. Therefore, as far as this embodiment is concerned, it is understood that the attitude control of the sensor 3 can be realized if the rotation angle around the x axis only is adjusted. However, if a path from a starting point to an end point is a sharp curve, it may be necessary to adjust at least one of the rotation angles around the y and z axes in addition to the x axis in order to more accurately measure the visual objects within the range of the visual sensor's sight.

Figure 4:
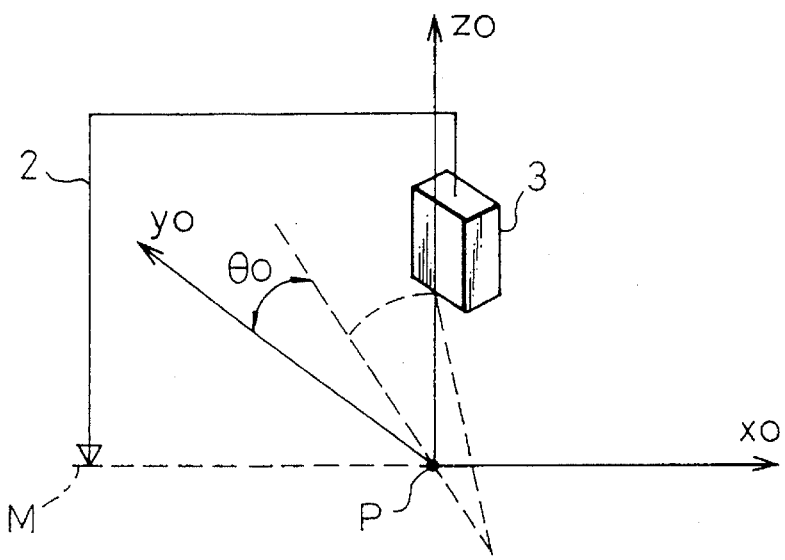
FIG. 4 shows a reference attitude of a visual sensor.

FIG. 4 shows a reference attitude of a visual sensor. This drawing shows an angle $\theta_o$ representing the attitude of the visual sensor 3 incorporated into the welding torch 2 at the time a movement is started. In the drawing, xo, yo and zo denote axes as explained below, when the welding torch 2 is positioned at a starting point before moving. The reference xo denotes an axis which passes through the tip M of the welding torch 2, and the visual center P of the visual sensor 3, and is parallel to the forward direction of the visual sensor 3. The reference zo denotes an axis which passes through the visual center P and a center O of the visual sensor 3. The reference yo denotes an axis which is orthogonal to both the xo axis and the zo axis. The angle $\theta_o$ in the drawing indicates the slope of the iron plate for welding to the y axis.

Figure 5:
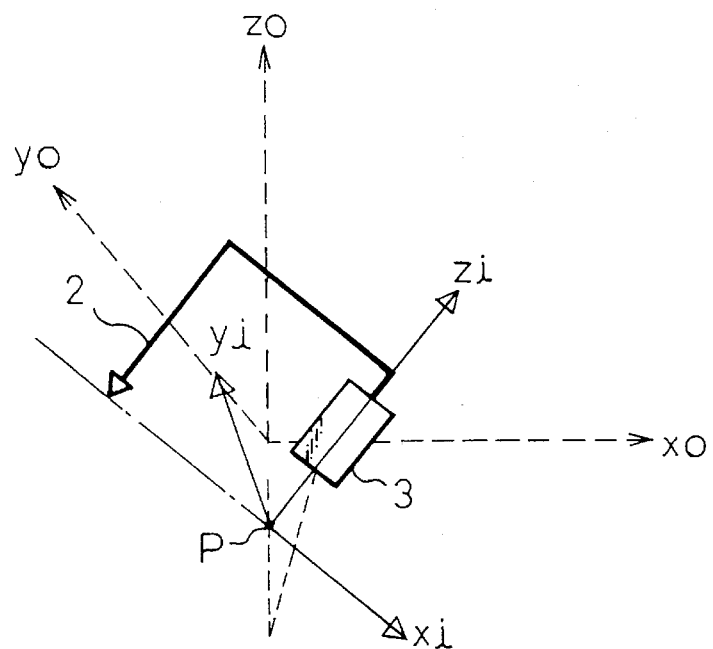
FIG. 5 shows the relationship between reference attitude and moving attitude of a visual sensor.

FIG. 5 shows the relationship between reference attitude and moving attitude of a visual sensor. This drawing shows an attitude of the visual sensor 3 incorporated into the welding torch 2 when the torch 2 is moving and welding an iron plate 4 to an iron plate 5. In the drawing, xi, yi and zi denote the axes as explained below. The reference xi denotes an axis which passes through a tip of the welding torch 2 as a tool, namely a point M, and a visual center P of the visual sensor 3, and is parallel to the forward direction of the visual sensor 3. The reference zi denotes an axis which passes through the visual center P and a center O of the visual sensor 3. The reference yi denotes an axis which is orthogonal to both the xi axis and the zi axis. As previously explained referring to FIG. 4, references such as xo, yo and zo denote axes when the welding torch 2 is positioned at a starting point before moving. These axes such as xo, yo and zo are determined in the same manner as the axes xi, yi and zi. At each sampling time, each of axes xi, yi and zi is measured, then the attitude of the visual sensor 3 is adjusted so that each of the axes xi, yi and zi becomes parallel to the corresponding axes xo, yo and zo by rotating around at least one of axes x, y and z when the welding torch 2 starts to move. In this way, the attitude of the visual sensor 3 in between two points, from start to end, is controlled as the sensor 3 moves between the two points. Therefore, even if a path from a starting point to an end point is a sharp curve, the attitude of the sensor 3 can be well controlled without teaching the attitude of the sensor 3 at a large number of points in the curve unlike the prior art, and accurate welding between the two plates 4 and 5 can be realized.

As heretofore explained, according to the attitude control method of a visual sensor utilized for an industrial robot according to the present invention, the teaching operation for the attitude of the visual sensor become simplified and the necessary operation time can be reduced, even if the visual sensor has to detect a complicated line like a sharp curve because the method of the present invention only requires teaching operations at two points, namely, a starting point and an end point. Furthermore, highly accurate, reliable measurement by the visual sensor can be realized because the attitude of the sensor is automatically and continually controlled according to the present invention.

We claim:

1. An attitude control method of a visual sensor utilized for an industrial robot, wherein said method controls the attitude of the visual sensor so that the sensor may detect an object when a tool (2) attached to a robot (1) moves along with said sensor (3) incorporated into said tool, is characterized in that it comprises:

a first step of teaching positions of a starting point and an end point on a path of said tool through which said tool moves;

a second step of memorizing initial attitude data representing the attitude at said starting point of said visual sensor;

a third step of periodically sampling and memorizing moving attitude data representing the attitude of said visual sensor when said tool moves through said path; and a fourth step of controlling the attitude of said sensor so that the attitude of said sensor after sampling said moving attitude data at each sampling time matches the attitude represented by said initial attitude data, based on both said initial attitude data and said moving attitude data;

and by achieving said above steps, said attitude of said sensor is controlled so that said visual center of said sensor matches said object to be detected by said sensor when said tool moves.

* * * * *